United States Patent [19]

Misencik et al.

[11] 3,999,103
[45] Dec. 21, 1976

[54] MULTI-POLE GROUND FAULT CIRCUIT BREAKER

[75] Inventors: John J. Misencik, Shelton; Kenneth R. Coley, Fairfield, both of Conn.

[73] Assignee: Westinghouse Electric Corporation, Pittsburgh, Pa.

[22] Filed: Mar. 14, 1975

[21] Appl. No.: 558,564

[52] U.S. Cl. ............................ 317/18 D; 317/58; 335/18; 336/175; 336/174
[51] Int. Cl.² ............................................ H02H 3/28
[58] Field of Search ............ 317/18 D, 18 R, 58; 335/9, 10, 13, 18; 336/175, 174, 173, 73, 229

[56] References Cited
UNITED STATES PATENTS

| | | | |
|---|---|---|---|
| 3,665,356 | 5/1972 | Douglas et al. | 336/175 X |
| 3,683,302 | 8/1972 | Butler et al. | 336/174 X |
| 3,717,792 | 2/1973 | Gryctko | 317/18 D |
| 3,742,305 | 6/1973 | Hobson, Jr. et al. | 317/18 D |
| 3,745,414 | 7/1973 | Frantti et al. | 317/18 D |
| 3,795,841 | 3/1974 | Klein | 317/18 D |
| 3,855,502 | 12/1974 | Pardue et al. | 317/18 D |
| 3,858,130 | 12/1974 | Misencik | 335/18 |
| 3,908,154 | 9/1975 | Gryctko | 317/18 D X |

*Primary Examiner*—J. D. Miller
*Assistant Examiner*—Patrick R. Salce
*Attorney, Agent, or Firm*—L. P. Johns

[57] ABSTRACT

Ground fault circuit breaker structure characterized by an insulating integral housing having side-by-side compartments that are separated by partition walls. A circuit breaker is located in each of two compartments and a ground fault detector is located in a compartment between the circuit breakers and isolated from the circuit breakers by the partition walls. The ground fault detector comprises a differential transformer comprising a current monitoring core, a plurality of primary windings on the core and comprising one of a line conductor of each circuit breaker, and a neutral one of an AC electrical distribution system, a secondary winding sensing current unbalance between the primary windings, means responsive to a predetermined sensing signal to open the line conductor; the line conductor of both circuit breakers extending between the corresponding circuit breaker trip means and through aperture means in the partition wall and through the magnetic core and back through the aperture means to the load terminal. The line conductors of both circuit breakers being looped through the coil in opposite current directions and located in the coil at substantially 120° from the location of the neutral conductor extending therethrough. The means responsive to a predetermined sensing signal including a pivotally movable member extending through the aperture means and movable against the trip member to unlatch the trip member.

7 Claims, 7 Drawing Figures

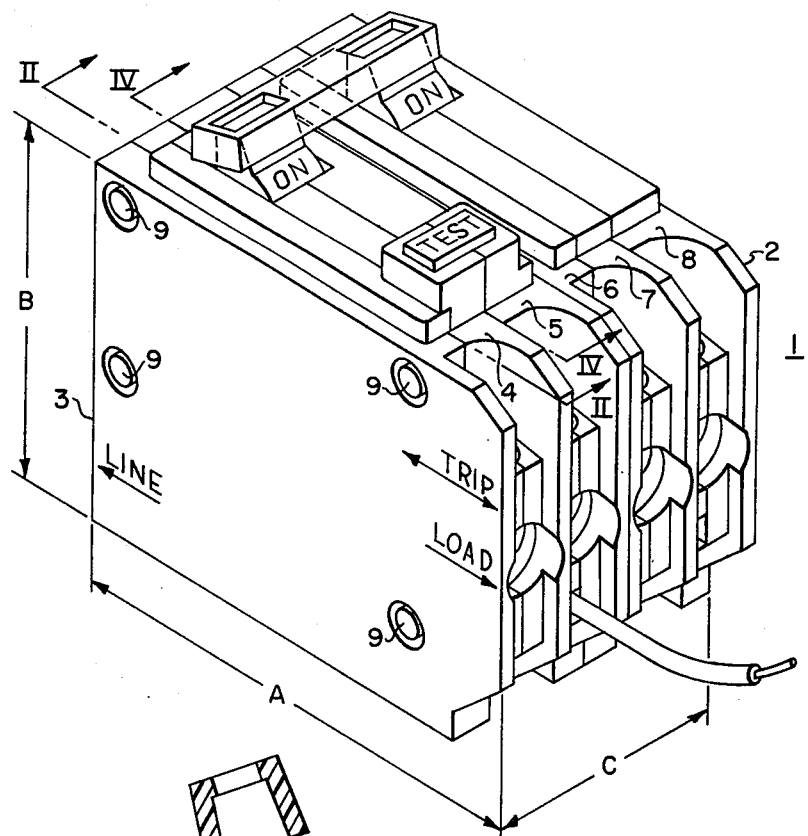
FIG. I.
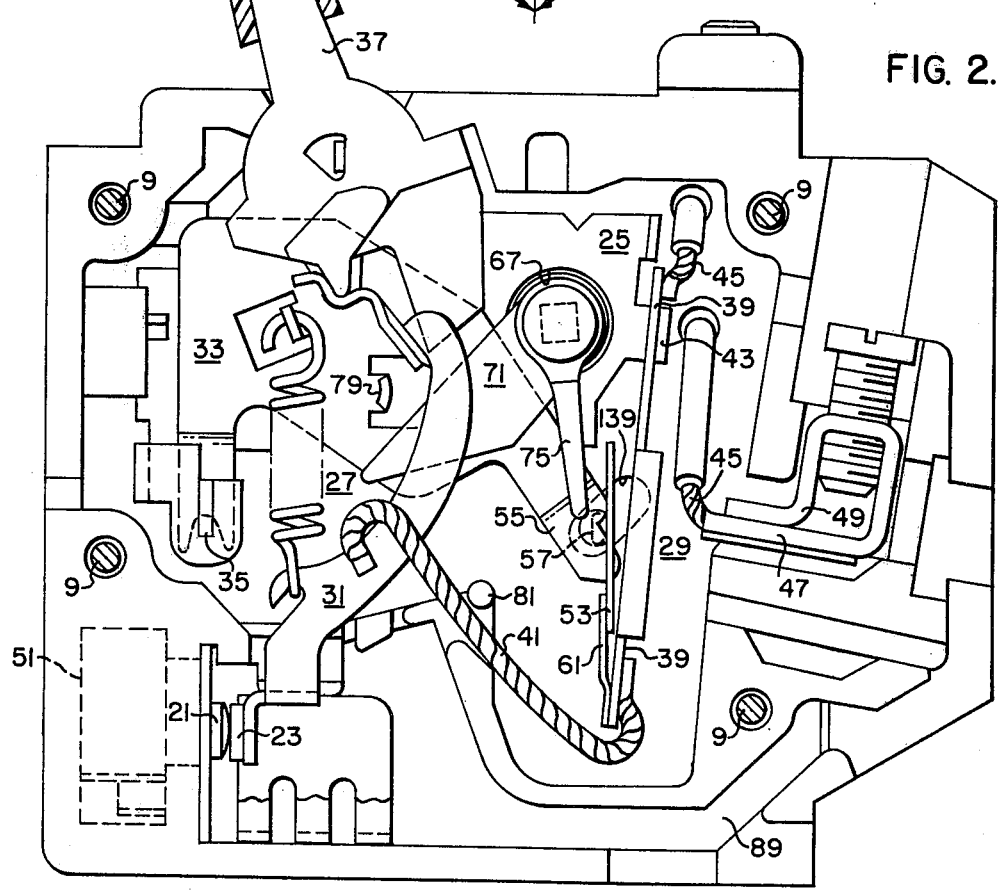
FIG. 2.

MULTI-POLE GROUND FAULT CIRCUIT BREAKER

CROSS-REFERENCE TO RELATED APPLICATIONS

This invention is related to an invention disclosed in the application of G. S. Zakrzewski and J. J. Misencik, Ser. No. 558,618, filed Mar. 14, 1975, and an invention disclosed in the application of J. J. Misencik, Ser. No. 558,617, filed Mar. 14, 1975.

BACKGROUND OF THE INVENTION

1. Field of the Invention

This invention relates to ground fault interrupter apparatus of the differential transformer type and more particularly it pertains to a ground fault detector in side-by-side position with a multi-pole circuit breaker structure.

2. Description of the Prior Art

A standard circuit breaker of multi-pole construction has elements for sensing mainly thermal overload and magnetic overload currents. The ability of a multi-pole circuit breaker to transfer magnetic action from one pole to another when one of the conditions such as thermal overload or magnetic overload takes place to effect a disconnect in the other poles that are mutually coupled is used in constructing a multi-pole breaker. There is a need for a ground fault circuit breaker capable of such action when sensing a ground fault current flow on any of the poles and thereby effecting a disconnect on the mutually coupled poles. This action must be accomplished in a direct drive manner to maintain the necessary speeds required for personnel protection. An enhancement of this speed is absolutely necessary and is not achieved in a standard breaker for personnel protection.

In a ground fault multi-pole circuit breaker the essential criteria of a single pole ground fault circuit breaker is utilized. However, it can be inadequate because of new operating restrictions that are present in a multi-pole application. The multi-pole ground fault circuit breaker must work across 120/240 voltages which upon loss of any leg or pole must not impair the ability of the electronic section to sense and protect human beings when they are in a dangerous ground fault contact. Additionally, the ability to detect a grounded neutral condition must be present when either of the poles has power lost on it.

SUMMARY OF THE INVENTION

In accordance with this invention it has been found that a multi-pole ground fault circuit interrupter can be provided for use in original installations as well as in replacement of conventional circuit breakers mounted on load centers and panelboards. The multi-pole ground fault circuit interrupter of this invention comprises at least two circuit breakers, a ground fault detector, and an installation housing therefor having partitions forming side-by-side compartments, the partitions having aperture means therethrough; a first circuit breaker in a first compartment, the ground fault detector in the second adjacent compartment, and a second circuit breaker in a third compartment adjacent to the second compartment, each circuit breaker comprising a pair of cooperable contacts operable between open and closed positions, an operating mechanism for operating the contacts and comprising a latchable pivotally supported trip member, trip means for latching the trip member, a load terminal structure, a line terminal structure, a line conductor of an AC electrical distribution system connecting the trip means to the load terminal structure, a load neutral structure; the ground fault detector comprising a current monitoring coil, a plurality of primary windings on the coil, a secondary winding sensing current imbalance between the primary windings, means responsive to a predetermined sensing signal to open said line conductors; the line conductor of each circuit breaker being primary windings and extending from the trip means through the coil and to the load terminal structure, the load neutral structure extending through the core as a primary winding, the line conductors of both circuit breakers being looped through the coil in opposite current directions and being located in the coil at substantially 120° from the location of the load neutral structure, and the means responsive to a predetermined sensing signal including a pivotally movable member extending through the aperture means and movable against the trip member to unlatch the trip member.

The advantage of the multi-pole ground fault circuit interrupter of this invention is that it provides an economic ground fault multi-pole circuit breaker which possesses a simple disconnect system in that it utilizes two disconnect pressure cams on each pole latch of the straight bimetal and latch assembly which through the disconnect motion of one breaker applies a direct force through the intervening cavities and partitions onto a latch mechanism of the straight bimetal assembly of the adjacent poles. Moreover, it may be easily installed in a standard load center utilizing appropriate spacings for the application of 240 voltage line power.

BRIEF DESCRIPTION OF THE DRAWINGS

FIG. 1 is a perspective view of the ground fault circuit structure of this invention;

FIG. 2 is a vertical sectional view taken on the line II—II of FIG. 1 and showing one of the two identical circuit breakers of the invention and in the closed position;

DESCRIPTION OF THE PREFERRED EMBODIMENT

Figure 3:
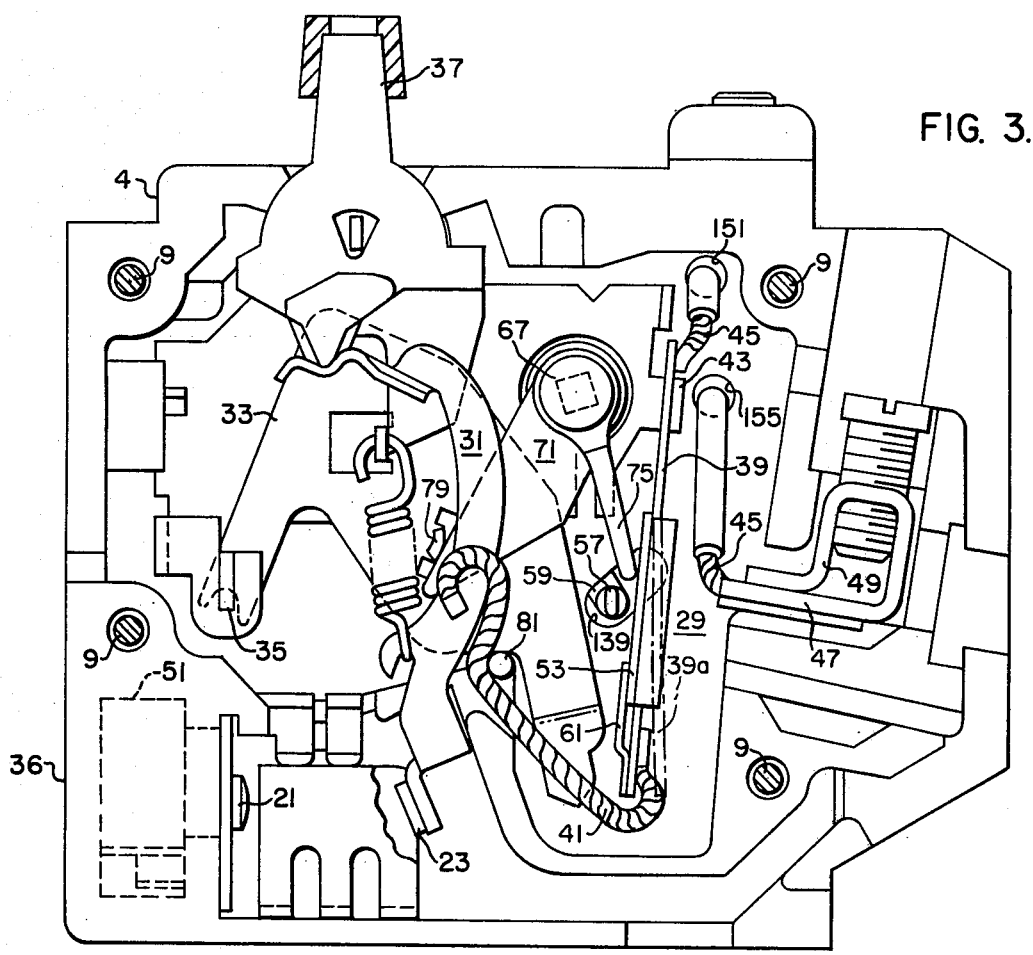
FIG. 3 is a view similar to FIG. 2 with the breaker shown in the tripped position.

In FIG. 1 a ground fault circuit breaker structure is generally indicated at 1 and it comprises a housing 2 which is composed of electrically insulating material such as a thermosetting resin. The housing 2 includes a side cover 3, a pair of adjacent trays 4, 5, a tray cover 6, and trays 7, 8, which are secured together by suitable means such as rivets 9 (FIG. 2) in a conventional manner.

The ground fault circuit breaker structure 3 has dimensions of length, height, and width indicated by the arrows A, B, and C, respectively, in FIG. 1. The length A, is approximately 3.18 inches; the height B, is approximately 2.38 inches; and the width C, is approximately 2 inches. With those dimensions the structure 1 is adapted to fit into the conventional load center box and panel cover. The width of 2 inches also enables the structure 1 to be used with the load center line stabs that are on 2 inch center lines.

Figure 5:
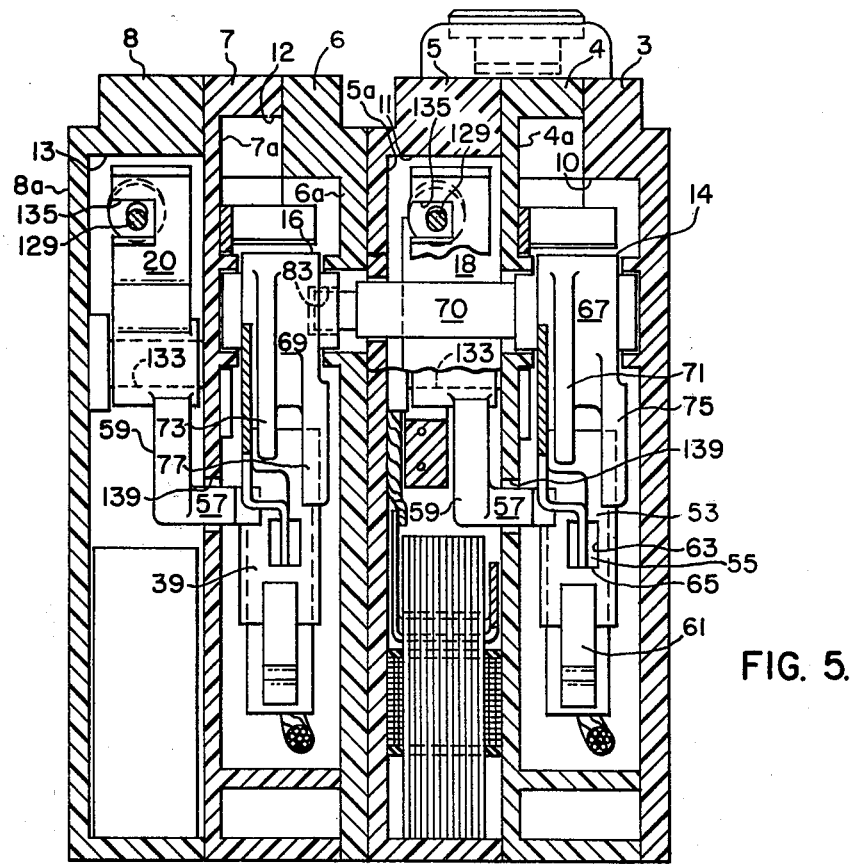
FIG. 5 is a sectional view taken on the line V—V of FIG. 4.

As shown in FIG. 5 the tray 4 comprises a back wall 4a which together with the cover 3 forms a compartment 10. Likewise, tray 5 comprises a back wall 5a which together with the back wall 4a forms a compartment 11. Similarly, the cover 6 and the tray 7 comprise back walls 6a and 7a, respectively, which form a compartment 12. Finally, the tray 8 comprises a back wall 8a which together with the back wall 7a form a compartment 13.

As shown in FIG. 5 first and second circuit breakers 14, 16 are disposed within the compartments 10 and 12, respectively, and first and second ground fault circuit interrupters 18, 20 are disposed within the compartments 11 and 13 respectively.

Inasmuch as a detailed description of both the circuit breakers 14, 16 and the ground fault circuit interrupters 18, 20 is set forth in the application of Kenneth R. Coley and John J. Misencik, Ser. No. 287,921, filed Sept. 11, 1972, the description of them is limited to the parts that are essential to the operation of the invention disclosed herein.

The circuit breakers 14, 16 are similar and each comprises a stationary contact 21 (FIG. 1), a movable contact 23, a supporting metal frame 25, an operating mechanism 27, and a trip device 29. Among other things the operating mechanism 27 comprises a contact arm 31 and a releasable member 33 which is pivotally supported at one end thereof on a pivot 35 when the circuit breaker is opened manually a handle 37 is rotated from the "on" or the "off" position, whereby the contact arm 31 moves the movable contact 23 away from the stationary contact 21 in a conventional manner.

The contact arm 31 is electrically connected to the lower end of an elongated bimetal element or bimetal 39 by a flexible conductor 41. The bimetal 39 is part of the trip device 29 and is secured at its upper end to a flange 43 of the frame 25.

A flexible line conductor 45 (FIG. 2) connects the upper end of the bimetal 39 with a terminal strap 47 having a terminal connector 49. Thus, the closed circuit through the circuit breaker extends from a terminal 51 through the stationary contact 21, the movable contact 23, the contact arm 31, the flexible conductor 41, the bimetal 39, the flexible conductor 45, the terminal strap 47 to the terminal connector 49.

The trip device 29 comprises the bimetal 39, an elongated rigid magnetic armature or latch member 53, an end portion 55 of the releasable member 33, and a projection 57 of a lever 59 (FIG. 5). The latch member 53 is mounted on the upper end of a flexible metal strip 61 the lower end of which is secured to the lower end of the bimetal 39 in a suitable manner such as a spot weld.

As shown in FIG. 5 the latch member 53 has an opening 63 which includes a latch surface 65 at the base of the opening in the reset position of the circuit breaker as shown in the drawings. The end portion 55 of the releasable member 33 is latched in the opening 63 of the latch member 53, and more particularly is lodged upon the latch surface 65. Upon the occurrence of a sustained overload current above a first predetermined value the bimetal 39 which is heated by the current flowing therethrough, deflects from the position shown in FIG. 2 to a thermally-tripped position to the right as shown, by the broken line position 39a whereupon the end portion 55 drops from its position on the latch surface 65.

Where a ground fault occurs and is detected in the ground fault circuit interrupter 18 in the compartment 11, as set forth in the above mentioned application, the lever 59 is actuated to cause the projection 57 at the lower end thereof to move the latch member 53 to the right and thereby disengage the end portion 55 of the releasable member 33 from the latch surface 65.

The operating mechanism 27 also comprises two insulating camming members 67 and 69 (FIGS. 2 and 5) which are interconnected by a shaft 70 (FIG. 5) to cause tripping of both circuit breakers simultaneously. Each camming members 67, 69 is composed of a molded electrically insulating material provided with an actuating part 71, 73, and an elongated finger 75, 77, that is molded integral therewith. As shown in FIGS. 2 and 3 each of the actuating parts 71, 77 (for example 71) is positioned under an associated projection 79 of the associated releasable member 33. Upon the occurrence of an overload in either of the circuit breakers, the associated releasable member 33 drops to the trip position (FIG. 3) during which movement the projection 87 engages the member 71 to rotate the member 67 whereupon the finger 75 moves against the armature 53 to the unlatching position. In addition the camming member 67 includes the elongated shaft 70 (FIG. 5) which extends through the compartment 13 and into the compartment 15 where it is seated within an opening 83 of the member 69. Inasmuch as the end of the shaft 70 is non-circular, for example square, and the opening 83 has a corresponding opening for receiving the square cross-section of the shaft, rotation of either member 67, 69 causes rotation of the other. Thus, when the releasable member 33 of either circuit breaker is tripped, the other circuit breaker is likewise tripped.

Figure 4:
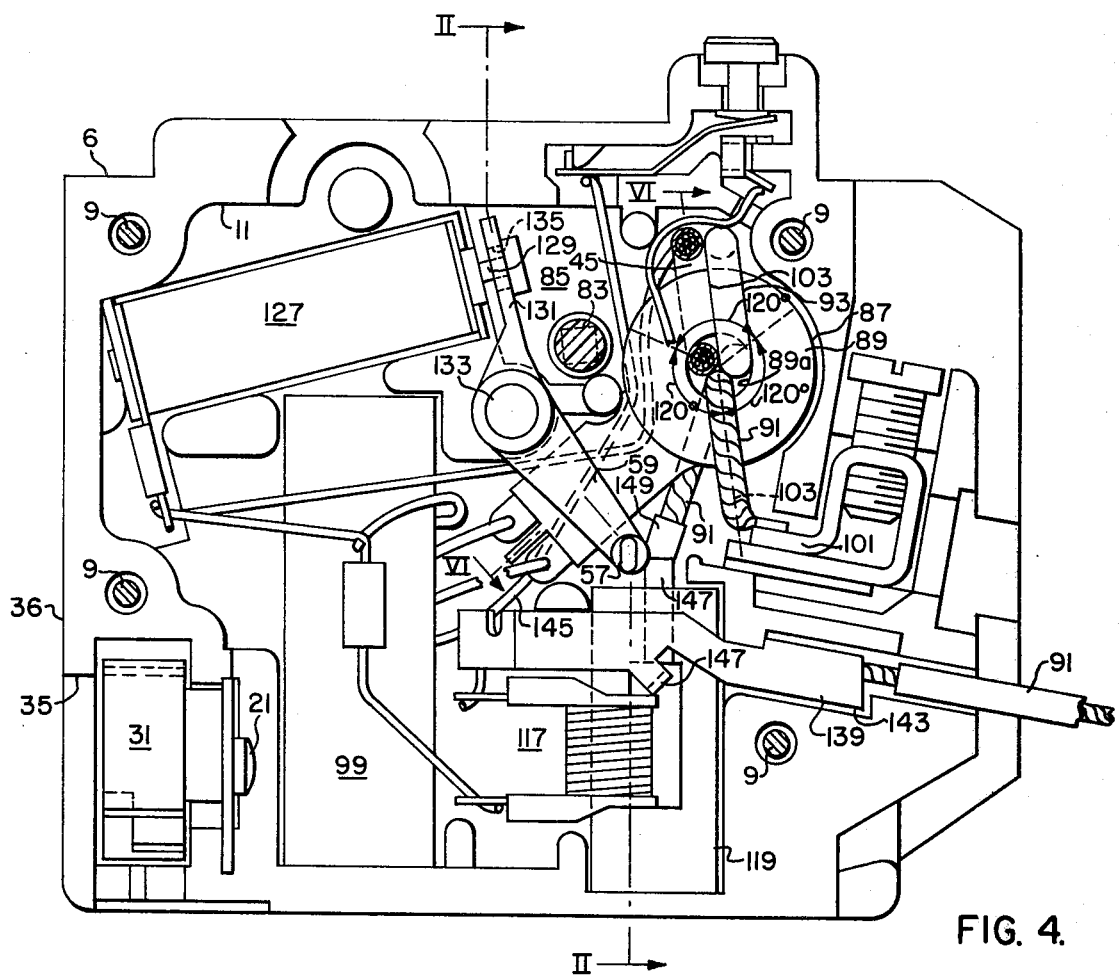
FIG. 4 is a vertical sectional view taken on the line IV—IV of FIG. 1 showing the ground fault detector side of the invention.

The ground fault detector or actuator in compartment 11 is generally indicated at 85 in FIG. 4 and is employed to avoid the adverse affects of the grounded neutral condition. Copending application Ser. No. 158,337, filed June 30, 1971 by K. R. Coley, J. J. Misencik, and J. R. Reeves, and assigned to the assignee of the present invention, relates to a grounded neutral detection structure using capacitive means connected between the neutral conductor and the line conductor. Upon the occurrence of a grounded neutral, the capacitive means becomes charged and results in an unbalanced condition appearing on the neutral and line conductors which is sufficient to cause tripping of the circuit breaker. This effect may be used with an additional magnetic core on the input side of the neutral conductor in order to limit current therein and permit use of a smaller capacitor. Alternately, a magnetic core around the neutral conductor on the input side can be used to provide an effective impedance that avoids the problems of the grounded neutral condition even in the absence of the above-mentioned capacitive means.

Figure 7:
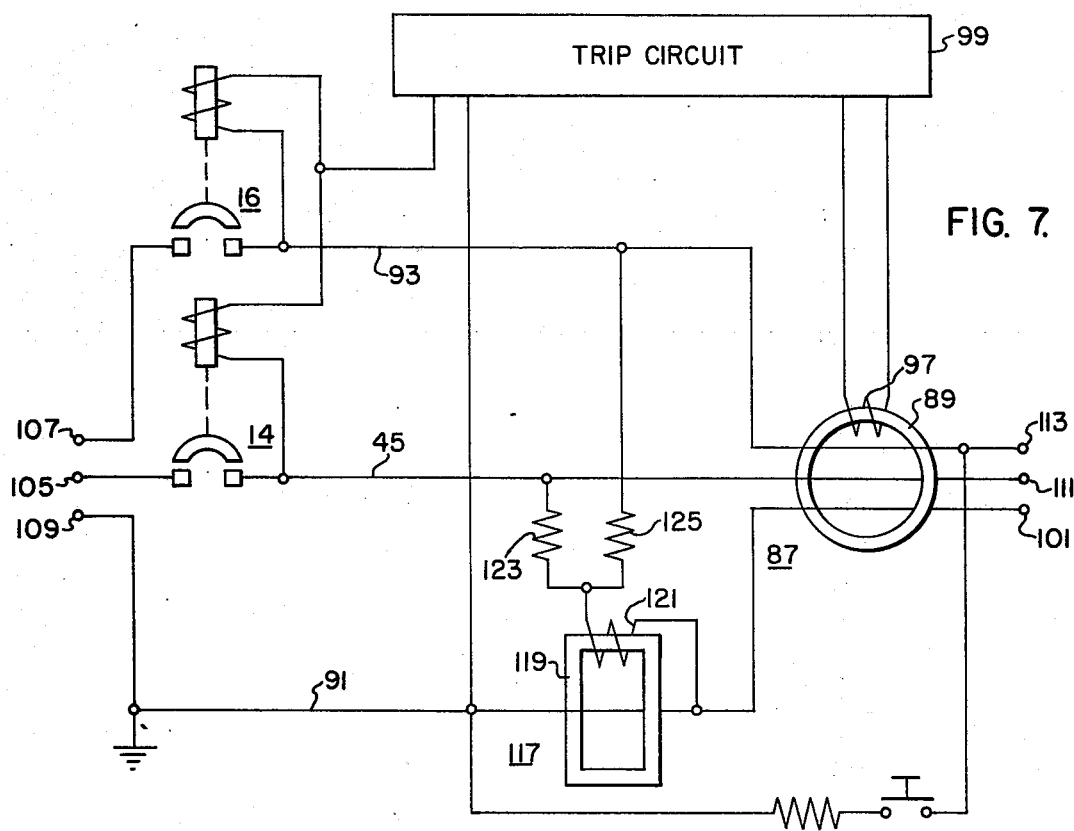
FIG. 7 is a diagram showing the electrical circuit of the invention.

In FIG. 7, the ground fault detector of the differential transformer type is shown schematically wherein a differential transformer 87 having a toroidal core 89 is provided with conductors including the line conductor 45, a neutral conductor 91, as well as a line conductor 93. The line conductor 45 extends from the circuit breaker 14 and the line conductor 93 extends from the circuit breaker 16. The conductors 45, 93, 91 extend through the core 89 as primary windings, each preferably of a single turn although multiple turn windings may be used if desired. The illustration of the conductors is merely schematic and in accordance with a preferred form. The conductors 45, 93, 91 are in coaxial arrangement as they pass through the core 89 as disclosed substantially in copending application Ser. No. 158,388, filed June 30, 1971 by J. R. Reeves et al, and assigned to the present assignee.

A sensing winding or sensor 97, usually of a plurality of turns, is provided on the core 89 for sensing an imbalance in the conduction current levels of the primary conductors. Such an imbalance produces a sensed current in the winding 97 which, if of sufficient magnitude and occurring for a sufficient time, actuates a trip circuit 99 in order to actuate the circuit breakers on the conductors 45, 93, 91, on the input side of the differential transformer 87. The trip circuit 99 may be of various known types including, for example, those disclosed in the above-mentioned copending application Ser. No. 158,338. The ground fault circuit interrupter 85, the trip circuit 99, and one circuit breaker are shown in copending application Ser. No. 219,710, filed Jan. 21, 1972, by E. W. Frantti and F. L. Gelzheiser and assigned to the present assignee.

Figure 6:
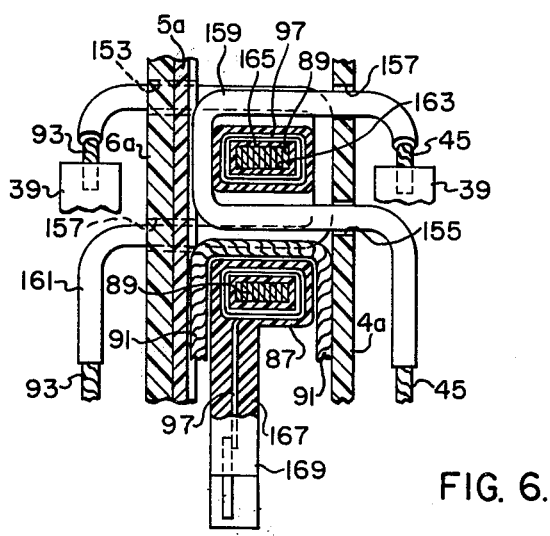
FIG. 6 is a sectional view taken on the line VI—VI of FIG. 4.

As shown in FIG. 6, the line conductors 45 and 93 extend through the core 89 in opposite current directions. Each conductor 45, 93 leads from the load (hot) terminal and extends from the top of the bimetal 39 through the tray walls 4a or 5a to and around the toroid coil or core 89 and then to a load terminal 101 for the corresponding circuit breaker. The load neutral conductor 91 also extends through the coil. Since both load conductors 45, 93 (shunt wires) extend through the coil 89, they provide vectoral balance and eliminate stray residual flux.

In accordance with this invention, in order to provide symmetry of conductor locations the legs of both conductors 45, 93 (FIG. 4) adjacent to the sides of the coil 89 are located substantially 180° from the legs of the neutral conductor 91 adjacent to the sides of the coil and in the same quadrant with each other. The legs of the conductors 45, 91 and 93 are the portions of the conductors next to those portions within the coil 89. The conductors 45, 93 are adjacent and parallel to each other with a line 103 of their contact in alignment with the axis of at least one of the legs of the neutral conductor 91. It is preferable that the conductors 45, 93 be as close as possible with only the insulation between the wires. Ideal conditions would be to place both conductors 45, 93 on the line 103 so that the axis of each would coincide with the line. Ideal conditions are not possible and practical conditions require that the conductors be insulated from each other. For that reason the conductors are placed adjacent to each other. Suffice it to say for the purpose of this invention the conductors 45, 93 function best in the positions shown rather than being separated from each other. As shown in FIG. 4, the locations of the portions of the conductors 45, 93, 91 within the toroid coil 89 are disposed at substantially 120° with respect to each other.

Generally, the electronic module is mounted between the two circuit breaker poles with leads being looped from opposite directions through the toroidal core. This arrangement maintains symmetry of the primary windings so as to minimize magnetic imbalance and ultimate trip level shift under heavy load current surges. The neutral leg enters the electronic section between the circuit breaker poles, is rounded through the grounded neutral transformer and the toroidal core, and then exits from the electronic section to its load terminal without having been routed through either circuit breaker section, thereby minimizing the problems of maintaining required spacing between conductors of varying voltage potentials. The electronic section is assembled with shunt wires (conductors 45, 93) extending outwardly on both sides for assembly to the circuit breaker poles. The shunt wires are fed through the opposite sides of both breaker poles where they are welded to small shunts and to the load terminals, thus completing the assembly.

The circuit illustrated is merely exemplary. The invention may also be embodied in a circuit having more than two conductors, such as a single phase, three wire system or a three phase, four wire system. Terminals 105, 107, and 109 on the input side are for connection to a power source or supply. One or more loads to be energized by the system may be connected to terminals 111, 113, and 101 on the output side.

If a ground fault occurs on the line conductor 93 in the load circuit, without a grounded neutral condition, the operation of the apparatus is essentially straightforward in accordance with past practice. If a leakage path to the ground occurs from the neutral conductor on the load side of the transformer, the apparatus would not be sensitive to line conductor grounds and would prevent an unknown hazard to those relying on the protection of the apparatus. The problems resulting from a grounded neutral condition are particularly serious when a load is not connected in the system.

As shown in copending application Ser. No. 218,771, filed Jan. 18, 1972, by K. R. Coley and J. J. Misencik, and assigned to the present assignee, an output transformer 117 of the current sensing type is provided on the load side of the sensor or differential transformer 87. The output transformer 117 has a core 119 on which a primary winding 121 is provided. The winding 121 is a conductor connected between the line and neutral conductors 45, 93 and 91 of the system. To minimize the losses in the primary winding 121 and to enable use of a small cross-section conductor a current limiting means such as resistances 123, 125 are interposed in series with the primary on the side of each line conductor 45, 93. In most applications a resistance of 10,000 to 35,000 ohms is suitable. The secondary of the output transformer 117 is the neutral conductor 91 preferably in a single turn. It is preferred that the ratio of primary to secondary turns be high, such as at least 1,000:1, because such a higher ratio of turns permits use of a smaller curve. The output transformer 87 improves reliability of the ground fault circuit breaker structure and provides protection defined under Underwriters Laboratories and CSA specifications. However, the output transformer may be omitted without altering the basic ground fault protection provided by the differential transformer 87.

In operation, in the absence of any load on the output terminals and also in the absence of any ground on the neutral conductor, a current path with minor losses is completed through the line conductors 45, 93, the primary winding 121, and the neutral conductor 91. The polarities of the windings of the output transformer 117 are not significant and the benefits are obtained whether or not they are the same as the primary windings of the transformer 87.

More particularly, the trip circuit 139 (FIG. 4) includes a solenoid 127 having a plunger 129. The lever 59 is mounted on a pivot pin 133 which is a molded portion of the back wall 5a. The lever 59 has a notch 135 (FIG. 5) which engages the solenoid plunger 129. The projection 57 (FIG. 5) extends through an opening 139 in the partition wall 4a and is adjacent the bimetal 39 (FIG. 2). When the solenoids 127 of both breakers are actuated, the levers 59, rotate slightly counterclockwise, whereupon the projections 57 move the bimetals 39 a sufficient distance to trip the circuit breakers 14, 16.

Inasmuch as only one toroidal coil 89 is required for this device, the compartment 13 contains no such coil. Rather, it contains a solenoid (not shown in FIG. 4) together with a lever 59 and other parts having similar reference numbers. Both circuit breakers are tripped simultaneously by their associated solenoid 127 and trip lever 59.

The portion of the neutral conductor 91 extending through the core 119 of the output transformer 117 comprises an adapter 139, the right end of which, as shown in FIG. 4, is connected at 143 to the cable portion of the conductor 91. The left end of the adapter 139 is connected to a lead wire 145 (FIG. 7) which is part of a test circuit. An intermediate portion of the adapter 139 includes a U-shaped part 147 which extends through the core 119 as the secondary winding thereof and which is connected at 149 to a continuation of the cable portion of the conductor 91. As shown in FIGS. 4 and 6 the cable portion 91 extends through the core 89 and continues to the terminal 101.

As shown in FIGS. 3 and 6 the flexible conductors 45, 93 extends through openings or aperture means 151 and 153 from the upper end of the bimetal 39 and around and through the core 89 and then through openings or aperture means 155 and 157 in the partition walls 4a and 5a where the conductors 45, 93 re-enter their corresponding compartments 10, 12 and are connected to the terminal straps 47 as set forth above. Insulating covers 159, 161 cover the flexible conductors 45, 93 to prevent electrical contact with each other and any portion of the ground fault circuit interrupter such as the neutral conductor 91.

As shown more particularly in FIG. 6, the core 89 comprises a stack of laminated rings 163 of an iron base composition which rings are encased within a cover 165 of an electrically insulating material. The coil 97 encircles the assembly of the laminated rings 163 and the cover 165 and the assembly of the rings, cover and coil are encased within an outer cover 167. The outer cover 167 has an outwardly extending arm portion 169 in which the two leads of the coil 97 are embedded and extend through the trip circuit (FIG. 7).

Operation of the structure 1 is essentially revealed in FIG. 7. It is assumed, for example, that the line conductor 45 is connected to an electrically hot stab of a load center through a plug-in or bolt-on type of breaker and the contact interrupting means are the breaker contacts so that any current utilized by any portion of the structure will pass through the contacts and be sensed by the bimetal 39 for overload or short circuit. The supplying voltage for the electronic means is therefore predicted requiring no external fusing.

In conclusion, the ground fault detector portion is separately housed from the heavy current circuit breaker side so that no undue influences occur from any debris or sparks which might develop in the circuit breaker section due to interruptions of circuit occurring from overloads or short circuits. The ground fault circuit breaker structure offers a side-by-side relationship that enables the transfer of sense function through the lever to the bimetal latch of the circuit breaker. It is the objective of this invention to shown an economic ground fault multi-pole circuit breaker which possesses a simple disconnect system in that it utilizes two disconnect pressure cams on each pole latch of the straight bimetal and latch assembly which through the disconnect motion of one breaker applies a direct force through the intervening cavities and partitions on to the latch mechanism of the straight bimetal assembly of the adjacent poles. The use of a nylon core case which permits multi-conductors in a configuration allowing magnetic shielding that suppresses the maximum current imbalance under all load conditions thereby creating reliable operation.

Finally, the housing employed in this invention provide side-by-side partitions and chambers suitably double insulating each breaker from the other, and allowing box terminal connections with the minimum amount of extraneous wire. Additionally, an intervening free chamber is provided for separation of adjacent hot load terminals which appear on the device at the outer extremities. Advantageously, this permits easy access for wiring so as not to obstruct the wiring area.

What is claimed is:

1. A ground fault circuit interrupter for use in a load center and comprising at least two circuit breakers, a ground-fault detector, each circuit breaker comprising a pair of cooperable contacts operable between open and closed positions, an operating mechanism for operating the contacts and comprising a latchable pivotally supported trip member, trip means for latching the trip member, a load terminal structure, a line terminal structure, a line conductor of an AC electrical distribution system connecting the trip means to the load terminal structure, a load neutral structure; the ground-fault detector between the circuit breakers and comprising a current monitoring coil, a plurality of primary windings on the coil, a secondary winding sensing current imbalance between the primary windings, means responsive to a predetermined sensing signal to open said line conductor; the line conductor of each circuit breaker as primary windings extending from the trip means through the coil and to the load terminal structure, the load neutral structure comprising a neutral conductor extending through the core as a primary winding, the line conductors of both circuit breakers being looped through the coil in opposite current directions and the leg portions of both line conductors being located adjacent to the coil at substantially 180° from the location of the leg portion of the load neutral conductor adjacent to the coil, and the means responsive to a predetermined sensing signal including a pivotally movable member extending through the aperture means and movable against the trip member to unlatch the trip member.

2. The ground fault circuit interrupter of claim 1 in which said lead conductors are in the same quadrant with each other within the coil.

3. The ground fault circuit interrupter of claim 1 in which said lead conductors are located with respect to each other so as to provide a vectoral balance.

4. The ground fault circuit interrupter of claim 1 in which an insulating housing is provided for the circuit breakers and the ground-fault detector.

5. The ground fault circuit interrupter of claim 4 in which the housing comprises at least three compartments in which the circuit breakers and ground-fault detector are separately disposed.

6. The ground fault circuit interrupter of claim 5 in which the ground-fault detector is in a side-by-side relationship with the circuit breakers.

7. The ground fault circuit interrupter of claim 1 in which the conductors are disposed within the coil at substantially 120° with respect to each other.

* * * * *